UNITED STATES PATENT OFFICE.

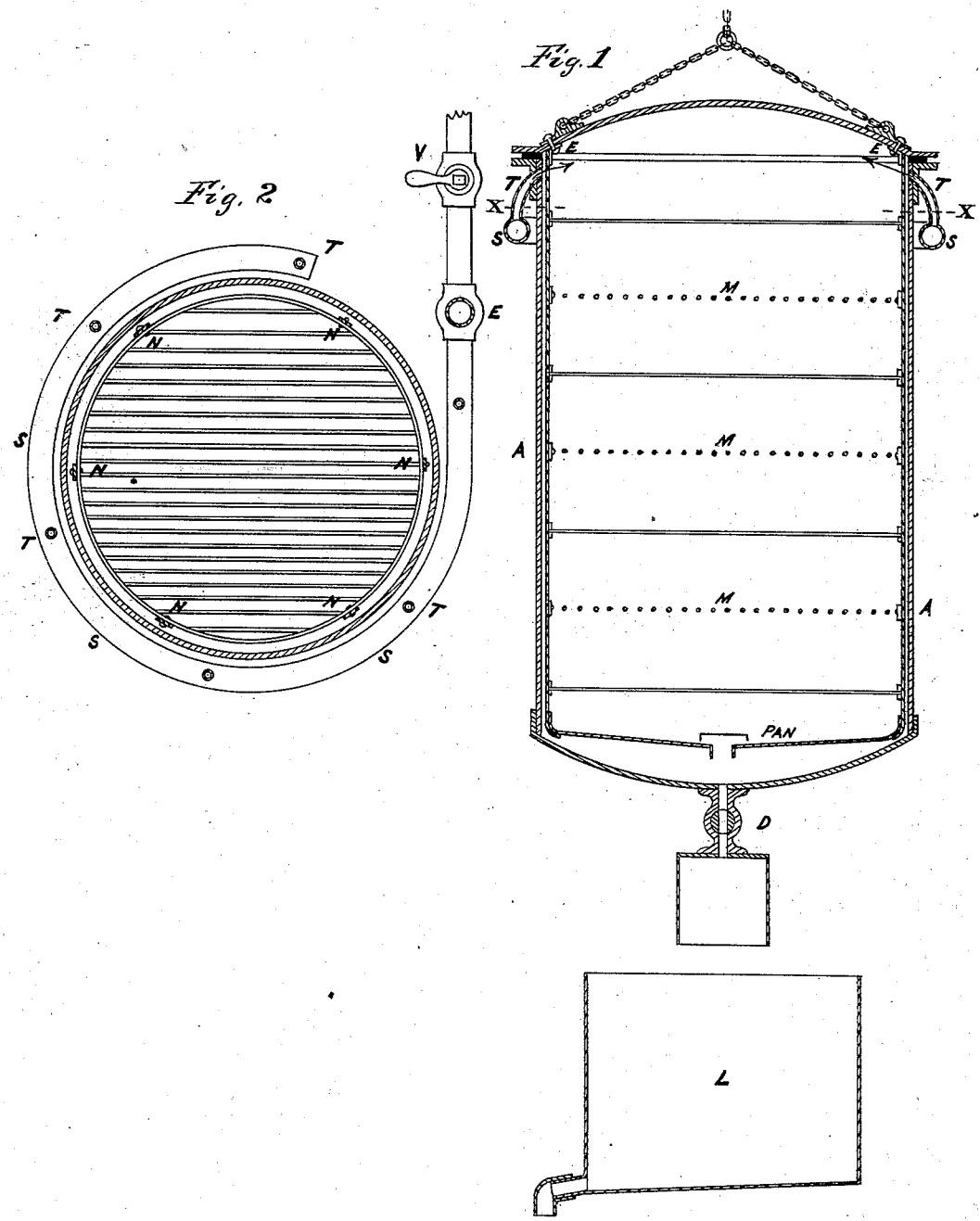

AZEL S. LYMAN, OF NEW YORK, N. Y.

IMPROVEMENT IN PROCESSES FOR PRESERVING MEAT.

Specification forming part of Letters Patent No. 219,168, dated September 2, 1879; application filed June 1, 1876.

*To all whom it may concern:*

Be it known that I, AZEL STORRS LYMAN, of the city, county, and State of New York, have invented a new and useful Process of Preparing Meat for Preservation; and I hereby declare the following to be a full, clear, and exact description of the same, reference being had to the accompanying drawings.

This method is an improvement upon the methods patented to me in patents numbered 91,552 and 181,695, and is intended to prepare for preservation the meat of freshly-killed animals; and consists in the removal of the ammonia and other impure products of the normal waste of the living animal from the meats, and at the same time cooking the meat by steam, and concentrating it by the evaporation of water from it.

The apparatus employed to effect the object in view may vary in form; but I have found that referred to in the following description and shown in the drawings to answer well.

In the drawings, Figure 1 shows a vertical central section of the steam-cylinder and grates, &c. Fig. 2 shows a cross-section through $x\ x$ of Fig. 1.

A A is a strong cylinder, used for cooking the meat by direct action of steam under pressure, and for removing from it the ammonia and other impure gases that impart to it the offensive odor and taste characteristic of freshly-killed meats. The diameter of the cylinder is three feet, the depth six feet, and it is well jacketed to prevent condensation during the operation of cooking.

The meat rests upon the rods M M while being treated. These rods are supported by hoops, through which their ends pass, forming racks. The hoops are riveted to the six vertical straps, N N, the upper ends of which are fastened to the covers, so that by it are supported the series of racks and all their loads. When closed, the cover rests upon a packing-ring, and is held by suitable clamps. It is lifted by a pulley and windlass.

Before introducing the meat the cylinder is closed and steam admitted by the cock V until it presses at least fifteen pounds per inch above the atmosphere. It passes by pipe S, through six small tubes, T T, up toward the cover, and presses the air, which is heavier and tends to remain below the steam, down out the cock D, which is left slightly open even after the air has escaped, so that the condensed water may escape.

When the cylinder has become thoroughly heated and rinsed, the steam is blown off, the cover raised, and the grates covered with the meat to a suitable depth. The cover is let down upon the packing-ring, and the clamps applied and firmly screwed down. Steam is then let in by the cock V as rapidly as possible, the lower cock, D, being left partly open until steam begins to be wasted, then nearly closed, so as to allow little but the condensed water to escape.

The pressure is kept as near as possible at fifteen pounds per inch above the atmosphere during fifteen or twenty minutes when beef in thick pieces or large turtle are being treated; but when old fowls are being treated we heat only eight or ten minutes. In some cases we carry only eight or ten pounds per inch. If a uniform pressure is kept, very little nutriment escapes, and only the fat need be saved from the drippings.

It is very desirable to retain all the nutriment in the meat, and to concentrate the juices in it by evaporation. To do this it is found necessary to lower the pressure at the end of the time named very gradually. Where thick pieces are cooked it should not be lowered over three pounds per minute, and at this time the ammonia and other offensive gases which are concentrated in the fluids of the meat are evaporated, and escape while slowly blowing off, thus removing from the meat the rank objectionable animal odor and taste in a few minutes as thoroughly as they could have been removed in as many days by the ordinary mode of exposing it to the air. The clamps are then removed from the cover and air admitted and the meat withdrawn, and while still hot is packed in cans and sealed up and again heated for preservation.

This meat requires less heat and time of boiling in the cans, and is preserved with much more certainty than after it has hung for days in the air of the packery.

I do not claim cooking meat by steam, as that is not new; but

What I claim, and desire to secure by Letters Patent, is—

The process of preparing meat for preservation, which consists in placing the meat in a closed vessel and letting in steam of high pressure upon it until cooked, then slowly reducing the pressure, thus retaining the nutriment and concentrating the juice, but removing with the escaping steam the ammonia and other impurities that are present in the fluids of the meat and give it its rank animal odor and taste, then inclosing this meat in tight packages and again heating it, all substantially as and for the purposes specified.

AZEL STORRS LYMAN.

Witnesses:
 W. L. BENNEM,
 CHAS. E. HEBBERD.